United States Patent Office 3,564,042
Patented Feb. 16, 1971

3,564,042
DERIVATIVES OF ACETIC ACID
Rudolf G. Griot, Florham Park, N.J., assignor to Sandoz-Wander, Inc., Hanover, N.J., a corporation of Delaware
No Drawing. Filed Mar. 17, 1967, Ser. No. 623,798
Int. Cl. C07c 65/00, 69/76
U.S. Cl. 260—473                            2 Claims

ABSTRACT OF THE DISCLOSURE

The compounds are of the class of α,α-bis(p-chlorophenoxy)-α-substituted acetic acids and esters thereof which are useful as hypocholesteremic/hypolipemic agents.

---

This invention relates to derivatives of acetic acid. In particular the invention pertains to α,α-bis(p-chlorophenoxy)-α-substituted acetic acid and the lower alkyl esters thereof.

The compounds of the present invention may be represented structurally as follows:

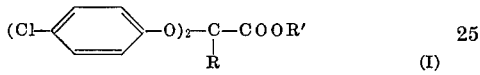

wherein:

R represents lower alkyl, preferably containing from 1 to 4 carbon atoms, e.g., methyl, ethyl, propyl and butyl, or phenyl; and R′ represents hydrogen or lower alkyl, preferably containing from 1 to 4 carbon atoms, e.g., methyl, ethyl, propyl and butyl.

The above compounds are prepared by reacting an alkali-metal salt of p-chlorophenol with an appropriately substituted α,α-dihaloalkanoic acid or alkyl ester thereof as illustrated by the following reaction scheme:

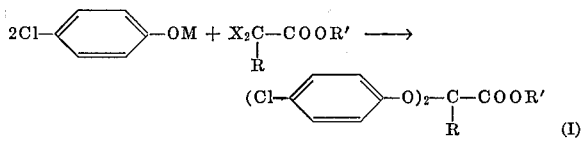

wherein R and R′ are as defined above, X represents chloro or bromo and M represents an alkali-metal, preferably sodium. The reaction is suitably carried out in an inert organic solvent, e.g., dimethyl sulfoxide and di-methyl acetamide and at an elevated temperature of from about 30 to about 140° C. The desired product is readily isolated in conventional manner.

The compounds of Formula I wherein R′ is hydrogen and R is as defined can also be prepared by basic hydrolysis of the corresponding esters of Formula I (R′=alkyl) in conventional manner.

Various of the reactants employed in the above process are known and can be prepared as described in the literature. Such others which are not specifically disclosed in the literature can be prepared from available materials in analogous manner.

The compounds of Formula I are useful because they possess pharmacological activity in animals. In particular such compounds possess hypocholesteremic activity and can be used as hypochloesteremic/hypolipemic agents. For such usage, the compounds may be admixed with conventional solid or liquid pharmaceutical carriers or diluents and other adjuvants, if necessary, and administered orally in such forms as tablets, capsules, elixirs, suspensions and the like. The dosage administered will, of course, vary depending upon the compound employed.

However, in general, satisfactory results are obtained when administered at a daily dosage of from about 15 milligrams to about 30 milligrams per kilogram of animal body weight, preferably given in divided doses, 2 to 4 times a day, or in sustained release form. For most mammals the administration of from about 1 gram to about 2 grams of the compound in divided doses of from about 250 milligrams to about 1000 milligrams 2 to 4 times a day is adequate for the treatment of hypochloesteremia/hyperlipemia. A representative formulation suitable for oral administration is a table (prepared by standard tabletting techniques) and containing, by weight, 50 parts of α,α - bis(p-chlorophenoxy) - α - phenylacetic acid ethyl ester, 2 parts of tragacanth, 39.5 parts of lactose, 5 parts of corn starch, 3 parts of talcum and 0.5 part of magnesium stearate.

The following examples show representative compounds contemplated by the present invention and the manner in which said compounds are prepared. However, it is to be understood that the examples are intended for the purpose of illustration only and are not intended as in any way limiting the scope of the invention which is defined in the appended claims.

EXAMPLE 1

α,α-Bis(p-chlorophenoxy)-α-methylacetic acid ethyl ester

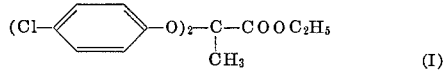

A suspension of 60% sodium hydride in mineral oil, 97 g., is washed free of mineral oil with toluene and then added to one liter of dry dimethyl sulfoxide under a nitrogen atmosphere. While cooling, 34 g. of p-chlorophenol is then added and the resulting mixture stirred until a clear solution is obtained. To the resulting solution is added 20 g. of potassium iodide. To the resulting mixture is then added, with stirring, 206.5 g. of α,α-dichloropropionic acid ethyl ester while maintaining the reaction temperature between 30° and 55° C. After the addition is completed the reaction mixture is stirred for an additional hour at 30° to 55° C. and then for an additional 15 hours at 50° to 60° C. The solvent is then removed in vacuo at 56° C. and the residue cooled to room temperature (20–25° C.) and then poured over 3 kilograms of ice-water. The resulting mixture is extracted 6 times with 1.5 liters (each) of isopropyl ether and the organic phase washed three times with 1 liter (each) of 1 N sodium hydroxide at 5° C. and then three times with 1 liter (each) of ice-water. The organic phase is then dried over anhydrous magnesium sulfate and the solvent evaporated in vacuo. The resulting oil is distilled and then redistilled to obtain α,α - bis(p - chlorophenoxy)-α-methylacetic acid ethyl ester, B.P. 169°/0.20 mm. The product crystallizes upon standing and is recrystallized from ethanol to obtain α,α-bis(p-chlorophenoxy)-α-methyl acetic acid ethyl ester, M.P. 66°–68° C.

EXAMPLE 2

α,α-Bis(p-chlorophenoxy)-α-phenylacetic acid ethyl ester

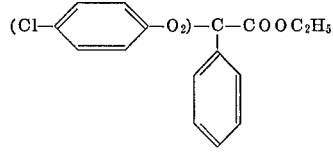

A suspension of 60% sodium hydride in mineral oil, 5.76 g., is washed free of mineral oil with toluene and then added, at 15° C., to 60 ml. of dimethylacetamide. While maintaining the reaction temperature between 15° and 20° C., a solution of 16.8 g. of p-chlorophenol in 40 ml. of dimethylacetamide is then added. To the resulting mixture is then added, with stirring, a solution of 15.3 g. of α,α-dichloro-α-phenylacetic acid ethyl ester in 20 ml. of dimethylacetamide. After the addition is completed the reaction mixture is stirred for an additional 70 hours at 60°–70° C. and then an additional 4 hours at 130° C. The resulting mixture is then cooled to room temperature (20–25° C.) and then poured over 2 kilograms of ice-water. The mixture thus obtained is extracted four times with 700 ml. (each) of isopropyl ether and the organic phase washed first with 150 ml. of ice cold 1 N sodium hydroxide and then three times with 600 ml. (each) of cold water (5° C.). The organic phase is then dried over anhydrous magnesium sulfate and the solvent evaporated in vacuo. The resulting oily residue is distilled to obtain α,α-bis(p-chlorophenoxy)-α-phenylacetic acid ethyl ester, B.P. 200° C./0.05 mm. which upon standing at room temperature crystallizes. The crystalline material is recrystallized from ethanol to obtain α,α-bis(p-chlorophenoxy)-α-phenylacetic acid ethyl ester, M.P. 89° C.

What is claimed is:
1. A compound of the formula

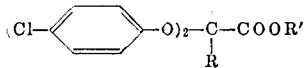

wherein
R represents phenyl; and
R' represents hydrogen or lower alkyl.
2. The compound of claim 1 which is α,α-bis(p-chlorophenoxy)-α-phenylacetic acid ethyl ester.

References Cited
UNITED STATES PATENTS

| | | | |
|---|---|---|---|
| 3,378,582 | 4/1968 | Bolhofer | 260—520 |
| 3,370,084 | 2/1968 | Hatanaka et al. | 260—473 |

OTHER REFERENCES

Brunet et al., Chem. Abstr. 61: 1793g (1964).

LORRAINE A. WEINBERGER, Primary Examiner

E. J. SKELLY, Assistant Examiner

U.S. Cl. X.R.

260—520; 424—308, 317